Nov. 8, 1960  D. R. CARLISLE ET AL  2,959,003
FUEL BURNER
Filed June 5, 1958  2 Sheets-Sheet 1

Denis Richard Carlisle & Ernest Milner
INVENTORS

BY  Leech & Radue
ATTORNEYS

Nov. 8, 1960   D. R. CARLISLE ET AL   2,959,003
FUEL BURNER
Filed June 5, 1958   2 Sheets-Sheet 2
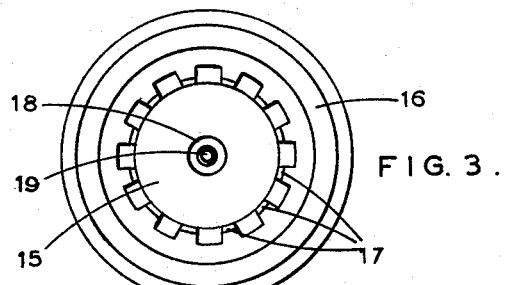
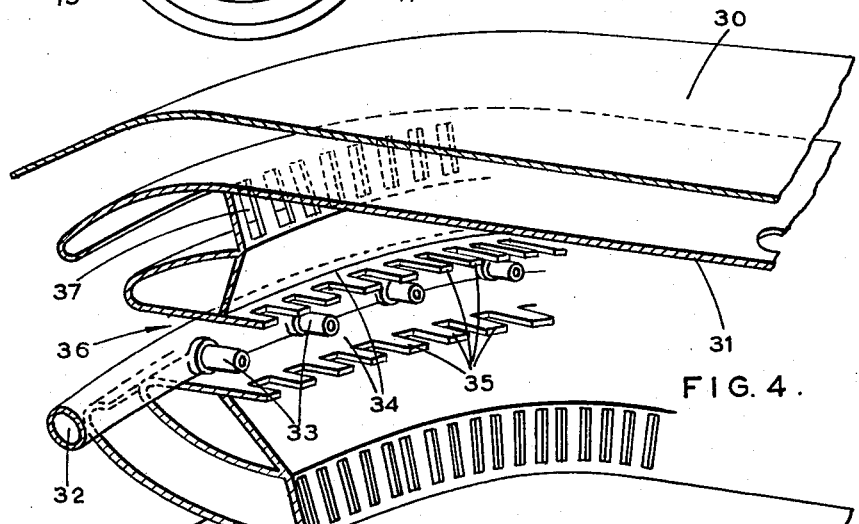
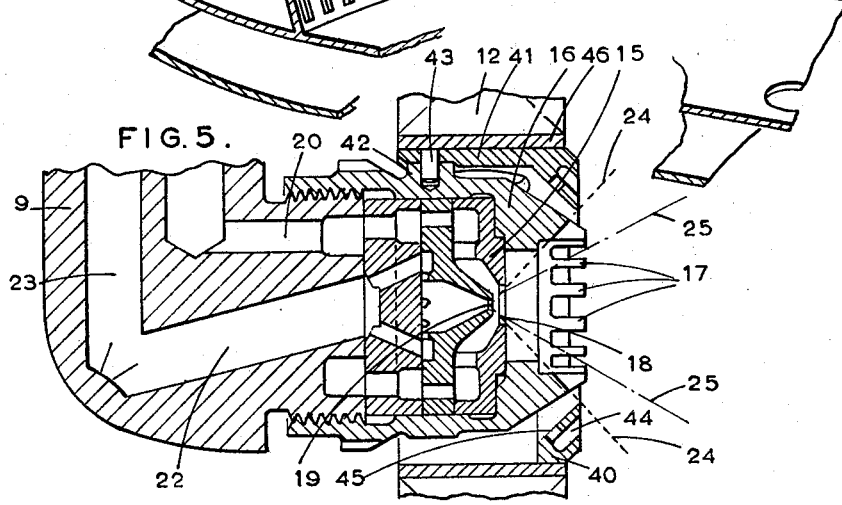
Denis Richard Carlisle & Ernest Milner
INVENTORS
BY   Leech & Radue
ATTORNEYS

2,959,003
Patented Nov. 8, 1960

2,959,003
FUEL BURNER

Denis Richard Carlisle, Risley, and Ernest Milner, Allestree, England, assignors to Rolls-Royce Limited, Derby, England, a British company Filed June 5, 1958, Ser. No. 740,058

Claims priority, application Great Britain June 20, 1957

8 Claims. (Cl. 60—39.74)

This invention relates to a fuel burner for a continuous combustion internal combustion engine.

According to the invention the fuel burner comprises a fuel injector arranged to produce a divergent pilot fuel spray and a divergent main fuel spray, the fuel injector being partly enclosed by an open-ended cowling, the angle of divergence of the pilot fuel spray being such that at least a proportion of the pilot fuel spray impinges on the cowling, and the angle of divergence of the main fuel spray being such that substantially the whole of the main fuel passes through the open end of the cowling, without impinging on the cowling.

The fuel burner can be used in a cylindrical combustion chamber, in which case the burner is preferably arranged to produce conical fuel sprays, or a number of burners according to the invention can be spaced around an annular combustion chamber, in which case the cowling can also be annular.

The main and pilot fuel sprays can be in the form of conical sprays, divergent sheets or divergent narrow streams, as required. The fact that the pilot spray impinges on the cowling will assist in starting and re-starting combustion, but the fact that the main spray does not impinge on the cowling will prevent the cowling being subjected to heavy carbon deposits.

In the accompanying drawings:

Figure 3 is an end elevation of the burner shown in Figure 2; and

Figure 4 shows a portion of an annular combustion chamber, of a gas turbine engine, including burners embodying the invention.

Figure 5 is a figure corresponding to Figure 2 but showing a slightly different arrangement of the shroud around the burner.

Figure 1:
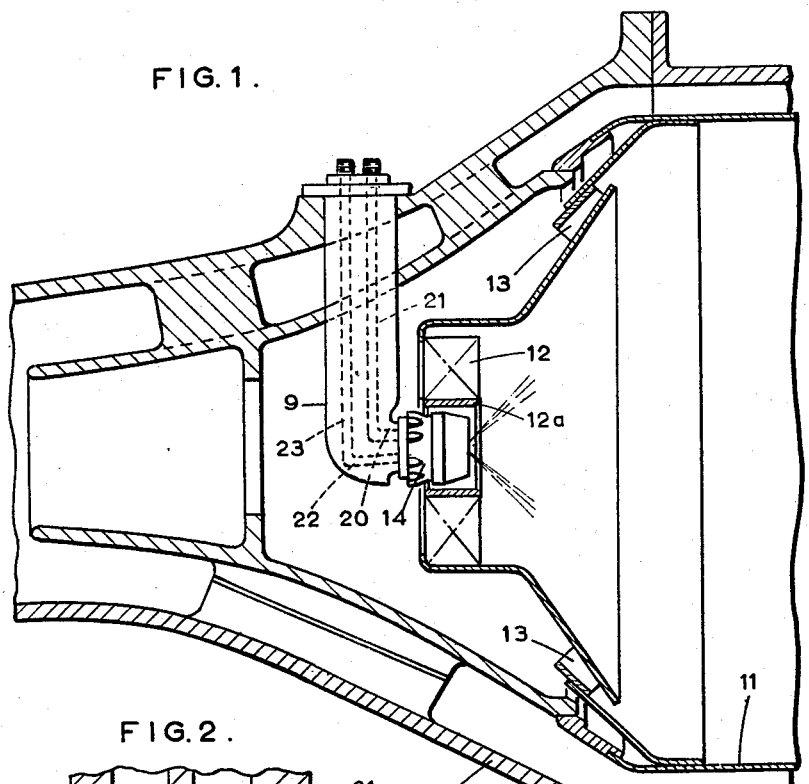
Figure 1 is a section through a cylindrical combustion chamber, of a gas turbine engine, embodying a burner according to the invention.

In Figure 1, the combustion chamber comprises an air casing 10 within which is supported a flame tube 11. At the upstream end of flame tube 11 are swirl vanes 12 through which air is supplied to the flame tube, attached to the inside edges of swirl vanes 12 is an annular cowling 12a. Air is also supplied to the flame tube through the annular passages 13.

A burner 14 is supported by a radial fuel supply duct 9, and the burner 14 includes a fuel injector 15 (Figure 2) and a cowling 16. The cowling 16 carries a number of short axial projections 17, known as spray bars.

Figure 2:
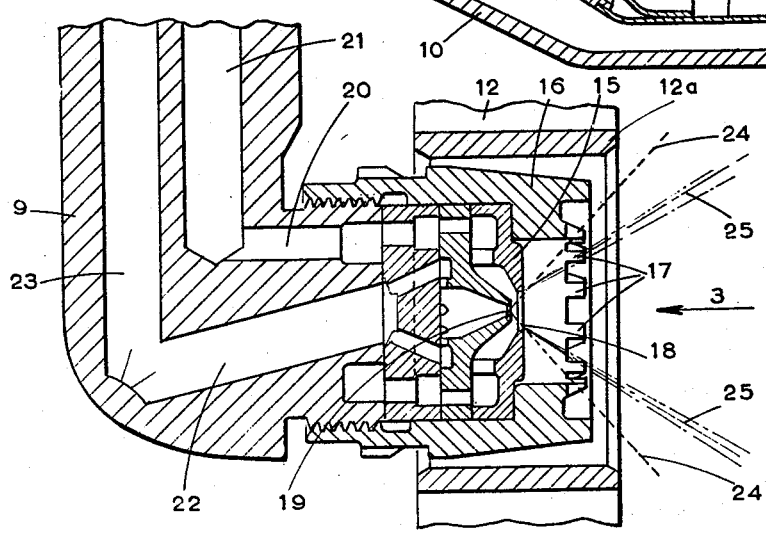
Figure 2 is an enlarged longitudinal central section through the burner shown in Figure 1.

The fuel injector 15 is in two parts, a main fuel injector having an aperture 18 and a pilot fuel injector having an aperture 19 (Figures 2 and 3). Fuel for the main fuel injector is supplied via axial passage 20 and radial passage 21, and fuel for the pilot fuel injector is supplied via axial passage 22 and radial passage 23.

The pilot spray, shown in Figure 2 as a pair of dotted lines 24 representing a conical envelope, is arranged to impinge upon the spray bars 17, but the main fuel spray 25 passes through the open end of the cowling 16. In practice, when the main fuel spray 25 is operative it entrains the pilot spray 24 and the whole of the fuel will pass through the open end of the cowling 16 and will not impinge upon the spray bars 17.

In Figure 4 is shown part of an annular combustion chamber comprising an annular air casing 30 and an annular flame tube 31. Fuel is supplied through an annular supply ring 32, around the linner periphery of which are spaced a number of fuel injectors 33. The injectors are partly enclosed by a cowling 34 having spray bars 35. Air can enter through the annular spaces 36 and through slots 37.

The burners 33 are each as described with reference to Figure 2 so that the pilot spray impringes upon the spray bars 35 and the main spray passes through the open end of the cowling 34 and into the flame tube 31.

If desired, the fuel injectors can provide divergent sheets or streams of fuel rather than conical fuel sprays.

The arrangement shown in Figure 5 is identical with that shown in Figure 2 except for the construction of the outer shroud 40 which has a number of rearwardly extending flanges 41 which are brazed to bosses 42 on the burner body and also located thereto by tapered pins 43 driven into the bosses some of them. The shroud is frusto conical and has an annular groove 44 formed in it into which air passes through holes 45 and issues into the combustion chamber. The outer shroud therefore directs air into the combustion chamber in two conical sheets the inner one of which is directed close over the spray bars and the outer of which acts to prevent the build up of carbon deposit on the outside of the shroud.

The swirl vanes 12 are carried by a ring 46 fitted around the shroud. By this means the swirl vanes are relieved of carrying the outer shroud, and the gap between the outer shroud and the burner can be kept more constant.

We claim:

1. A fuel burner for a continuous combustion, internal combustion engine which comprises a fuel injector having means to produce a divergent pilot fuel spray and means to produce a divergent main fuel spray, an open ended cowling partly enclosing the fuel injector, and the angle of divergence of the main fuel spray being such that substantially the whole of the main fuel passes through the open end of the cowling without impringing thereon, and the angle of divergence of the pilot fuel spray being such that during low airflows, such as during starting and when the means to produce the main fuel spray is inoperative, the spray impinges on the open end of the cowling, and during normal running the pilot fuel spray is entrained by the main fuel spray and does not impinge on the end of the cowling.

2. A fuel burner as claimed in claim 1, said cowling having an edge, means on said edge forming a series of axially extending spray bars projecting into the path of the pilot spray but not substantially into the path of the main spray.

3. A fuel burner as claimed in claim 2 in which said means to produce sprays comprises an inner nozzle through which the pilot spray is discharged, and a surrounding outer nozzle through which the main spray is discharged, said nozzles being so formed and arranged that during normal running when both are in operation the main spray entrains the pilot spray and causes it substantially to pass clear of the cowling.

4. A fuel burner as claimed in 3 mounted in a cylindrical combustion chamber, the fuel injector producing conical pilot and main sprays.

5. A fuel burner as claimed in 3 in which an outer cowling surrounds said cowling with an air space between them and with a series of swirl vanes mounted on the outside of the outer cowling to extend into the pathway of air entering the combustion chamber.

6. A fuel burner as claimed in claim 5 in which the outer cowling is internally frusto conical and cooperates with a frusto conical exterior of the inner cowling to provide an annular passageway for directing air flowing therethrough across the spray of fuel issuing from the burner.

7. A fuel burner as claimed in claim 6 in which means is provided on the outer cowling to direct the air flowing through the said passageway between the cowlings close to the edge of the inner cowling and said outer cowling is formed also to discharge a second annular air stream, outside the first said stream said second stream flowing across the fuel spray and in a direction away from the end of the said outer cowling.

8. For use in an annular combustion chamber, in combination, a series of fuel burners as claimed in claim 2, means mounting said burners in a ring at one end of said combustion chamber, said cowling comprising an annular member surrounding said burner ring and an annular member within the burner ring.

References Cited in the file of this patent

UNITED STATES PATENTS

| | | |
|---|---|---|
| 2,636,553 | Ballantyne | Apr. 28, 1953 |
| 2,700,416 | Johnson | Jan. 25, 1955 |
| 2,825,398 | Clarke | Mar. 4, 1958 |

FOREIGN PATENTS

| | | |
|---|---|---|
| 645,696 | Great Britain | Nov. 8, 1950 |
| 774,704 | Great Britain | May 15, 1957 |

OTHER REFERENCES

"Gas-Turbine Fuel Systems," Flight, vol. 56, No. 2132, page 596, published Nov. 3, 1949.